US011831140B2

(12) United States Patent
Venkatramani et al.

(10) Patent No.: US 11,831,140 B2
(45) Date of Patent: Nov. 28, 2023

(54) SYSTEM, CIRCUIT BREAKER, DISPLAY UNIT AND DISPLAY HOLDER

(71) Applicant: Siemens Aktiengesellschaft, Munich (DE)

(72) Inventors: Anand Venkatramani, Nuremberg (DE); Michael Gerstner, Roettenbach (DE); Bernd Schwinn, Fuerth (DE); Martin Muellhofer, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/699,351

(22) Filed: Mar. 21, 2022

(65) Prior Publication Data
US 2022/0302694 A1    Sep. 22, 2022

(30) Foreign Application Priority Data
Mar. 19, 2021   (DE) ...................... 10 2021 202 699.0

(51) Int. Cl.
*H02H 3/04*    (2006.01)
*H02H 3/08*    (2006.01)

(52) U.S. Cl.
CPC .............. *H02H 3/04* (2013.01); *H02H 3/081* (2013.01)

(58) Field of Classification Search
CPC ................................. H02H 3/04; H02H 3/081
See application file for complete search history.

(56) References Cited

U.S. PATENT DOCUMENTS

| | | | |
|---|---|---|---|
| 4,870,531 A * | 9/1989 | Danek | H01H 71/0228 361/679.17 |
| 4,945,443 A * | 7/1990 | DeBiasi | H02H 3/006 361/679.08 |
| 6,406,328 B1 * | 6/2002 | Attarian | H05K 5/0017 439/502 |
| 9,966,754 B2 | 5/2018 | Franke et al. | |
| 10,199,195 B2 | 2/2019 | Borgwardt | |

(Continued)

FOREIGN PATENT DOCUMENTS

| | | |
|---|---|---|
| CA | 2429921 A1 | 11/2003 |
| CN | 110998776 A | 4/2020 |

(Continued)

OTHER PUBLICATIONS

Detailed information for: EKIP Display x LSI-LSIG-M/LRIU XT2-XT4 ; ABB Product Details ; https://new.abb.com/products/1SDA068659R1/ekip-display-x-lsi-lsig-m-lriu-xt2-x14.

*Primary Examiner* — Scott Bauer
(74) *Attorney, Agent, or Firm* — Laurence A. Greenberg; Werner H. Stemer; Ralph E. Locher

(57) ABSTRACT

A circuit breaker system has a circuit breaker with a circuit breaker communication unit. A display unit contains a display housing, and the circuit breaker and the display unit are configured such that the display unit is latched to the circuit breaker. The circuit breaker and the display unit, in the latched state, are connected to one another by a plug connection, such that data of the circuit breaker are displayable on the display unit. A display holder is provided, containing a holder housing and a holder communication unit. The display holder is configured such that the display unit can be latched into the display holder, that the display holder and the display unit, in the latched state, are connected to one another by an electrical plug connection, and that the display holder is configured such that the data of the circuit breaker are displayed in the latched state.

13 Claims, 4 Drawing Sheets

(56) References Cited

U.S. PATENT DOCUMENTS

| | | |
|---|---|---|
| 10,209,280 B2 | 2/2019 | Borgwardt et al. |
| 10,218,167 B2 | 2/2019 | Franke et al. |
| 10,680,428 B2 | 6/2020 | Geissler et al. |
| 10,685,803 B2 | 6/2020 | Kupsch et al. |
| 10,804,045 B2 | 10/2020 | Franke et al. |
| 10,807,860 B2 | 10/2020 | Reinmuth |
| 10,916,929 B2 | 2/2021 | Kopaczewski et al. |
| 11,133,142 B2 | 9/2021 | Stehle |
| 2004/0204075 A1 | 10/2004 | Rusnak et al. |
| 2016/0063822 A1 | 3/2016 | Schwinn et al. |
| 2016/0064915 A1 | 3/2016 | Schwinn |
| 2016/0260569 A1* | 9/2016 | Mishra .................. H01H 71/025 |
| 2016/0379786 A1* | 12/2016 | Franke ................ H01H 71/0228 307/143 |
| 2019/0043683 A1 | 2/2019 | Gao et al. |
| 2019/0385806 A1 | 12/2019 | Plank et al. |
| 2020/0013574 A1 | 1/2020 | Krauss et al. |

FOREIGN PATENT DOCUMENTS

| | | |
|---|---|---|
| CN | 212136374 U | 12/2020 |
| DE | 102014217292 A1 | 3/2016 |
| DE | 102014217332 A1 | 3/2016 |
| DE | 102014218831 A1 | 3/2016 |
| DE | 102014218910 A1 | 3/2016 |
| DE | 102015217108 A1 | 3/2016 |
| DE | 102014224173 A1 | 6/2016 |
| DE | 102015216981 A1 | 6/2016 |
| DE | 102015226475 A1 | 11/2016 |
| DE | 102016201651 A1 | 11/2016 |
| DE | 102016202827 A1 | 11/2016 |
| DE | 102016201659 A1 | 12/2016 |
| DE | 102015216023 A1 | 2/2017 |
| DE | 102016205196 A1 | 10/2017 |
| DE | 102016210479 A1 | 12/2017 |
| DE | 102016217425 A1 | 3/2018 |
| DE | 102016221093 A1 | 4/2018 |
| DE | 102017201239 A1 | 7/2018 |
| DE | 102017205003 A1 | 9/2018 |
| DE | 102017205004 A1 | 9/2018 |
| DE | 102017211900 A1 | 1/2019 |
| DE | 102017212477 A1 | 1/2019 |
| DE | 102017214903 A1 | 2/2019 |
| DE | 102017214907 A1 | 2/2019 |
| DE | 102017215820 A1 | 3/2019 |

* cited by examiner

SYSTEM, CIRCUIT BREAKER, DISPLAY UNIT AND DISPLAY HOLDER

CROSS-REFERENCE TO RELATED APPLICATION

This application claims the priority, under 35 U.S.C. § 119, of German Patent Application DE 10 2021 202 699.0, filed Mar. 19, 2021; the prior application is herewith incorporated by reference in its entirety.

FIELD AND BACKGROUND OF THE INVENTION

The invention relates to the technical field of a circuit breaker system for an electrical low-voltage circuit, a circuit breaker for an electrical low-voltage circuit, a display holder for a display unit of a circuit breaker, and a display unit for a circuit breaker.

Circuit breakers are protective devices which function in a similar manner to a fuse. Circuit breakers monitor the current flowing through them by means of a conductor and interrupt the electric current or energy flow to an energy sink or a load, which is referred to as tripping, if protection parameters such as current limit values or current-time period limit values, i.e. if a current value is present for a certain time period, are exceeded. The interruption is effected, for example, by contacts of the circuit breaker which are opened. In contrast to a fuse, the protection parameters or response values are adjustable in the case of a circuit breaker, for example by means of a control unit, such as an electronic trip unit.

Particularly for low-voltage circuits or networks, there are different types of circuit breakers depending on the magnitude of the electric current provided in the electrical circuit. Within the meaning of the invention, circuit breaker is taken to mean in particular switches such as are used in low-voltage installations for currents of 25 or 63 to 6300 amperes. More specifically, enclosed circuit breakers are used for currents of 25 or 63 to 1600 or 2000 or 2500 amperes, in particular of 125 to 630 or 1200 amperes. Exposed circuit breakers are used in particular for currents of 630 to 6300 amperes, more specifically of 1200 to 6300 amperes.

Exposed circuit breakers are also referred to as air circuit breakers, ACB for short, and enclosed circuit breakers are referred to as molded case circuit breakers or compact circuit breakers, MCCB for short.

Low voltage is taken to mean voltages of up to 1000 volts AC voltage or 1500 volts DC voltage. Low voltage is furthermore taken to mean voltages that are greater than the extra-low voltage with values of 50 volts AC voltage or 120 volts DC voltage.

Within the meaning of the invention, circuit breaker is taken to mean circuit breakers with an electronic trip unit, ETU for short, which serves as a control unit. The control unit monitors the magnitude of the electric current measured by sensors, such as a Rogowski transformer (Rogowski¬coil), or in addition analogously of the voltage or/and of other parameters of the electrical circuit and brings about an interruption of the electrical circuit if threshold values are exceeded.

Circuit breakers have in some instances a display or display unit fixedly connected to the circuit breaker. Protection parameters, set values or/and measured values, etc., can be displayed on the display or display unit.

Circuit breakers in accordance with the prior art are known for example from the following published, non-prosecuted German patent applications: DE 10 2014 217 292 A1 (corresponding to U.S. patent publication No. 2016/0064915); DE 10 2014 217 332 A1 (corresponding to U.S. patent publication No. 2016/0063822); DE 10 2015 217 108 A1; DE 10 2014 218 831 A1; DE 10 2014 218 910 A1; DE 10 2016 201 651 A1 (corresponding to U.S. Pat. No. 10,218,167); DE 10 2015 226 475 A1 (corresponding to U.S. Pat. No. 9,996,675); DE 10 2015 216 981 A1; DE 10 2016 202 827 A1; DE 10 2016 201 659 A1; DE 10 2015 210 479 A1 (corresponding to U.S. Pat. No. 9,991,079); DE 10 2014 224 173 A1 (corresponding to U.S. Pat. No. 10,804,045); DE 10 201 5 216 023 A1 (corresponding to U.S. Pat. No. 10,199,195); DE 10 201 6 217 425 A1 (corresponding to U.S. Pat. No. 10,680,428); DE 10 2016 205 196 A1; DE 10 2016 221 093 A1 (corresponding to U.S. Pat. No. 10,658,803); DE 10 2017 211 900 A1; DE 10 2017 201 239 A1 (corresponding to U.S. patent publication No. 2018/137805); DE 10 2017 205 003 A1 (corresponding to U.S. patent publication No. 2018/171923); DE 10 2017 205 004 A1 (corresponding to U.S. Pat. No. 11,133,142); DE 10 201 7 212 477 A1; DE 10 2017 214 903 A1 (corresponding to U.S. Pat. No. 10,916,289); DE 10 2017 214 907 A1; and DE 10 2017 215 820 A1.

SUMMARY OF THE INVENTION

It is an object of the present invention to improve a circuit breaker with display of the type mentioned in the introduction, in particular to make the use of a display more universal.

This object is achieved by means of a circuit breaker system as claimed in the independent circuit breaker system patent claim, a circuit breaker as claimed in the independent circuit breaker patent claim, a display holder as claimed in the independent display holder patent claim or a display unit as claimed in the independent display unit patent claim.

The invention provides a circuit breaker system for an electrical low-voltage circuit, containing a (at least one) circuit breaker. The circuit breaker having:
  a circuit breaker housing having connections for conductors of the low-voltage circuit,
  a current sensor, for determining the magnitude of the current in the low-voltage circuit,
  an interruption unit containing contacts for interrupting the low-voltage circuit, and
  an electronic control unit (ETU), which is connected to the current sensor and the interruption unit and which initiates an interruption of the low-voltage circuit in the event of current limit values or current-time limit values being exceeded.

According to the invention, the circuit breaker has a circuit breaker communication unit. Furthermore a display unit containing a display housing. According to the invention, the circuit breaker and the display unit are configured in such a way that the display unit can be latched to the circuit breaker, such that it is visible on the circuit breaker. The circuit breaker and the display unit, in the latched state, are connected to one another by an electrical plug connection, such that data of the circuit breaker are displayable on the display unit.

According to the invention, a display holder is provided, containing a holder housing and a holder communication unit. The display holder is configured in such a way that the display unit can be latched into the display holder. Furthermore, that the display holder and the display unit, in the latched state, are connected to one another by an electrical plug connection. According to the invention, the display holder, by means of the holder communication unit, can establish a communication connection, in particular a wireless communication connection, to at least one circuit breaker communication unit. Furthermore, the display holder is configured in such a way that the data of the (connected) circuit breaker can be displayed in the latched state of the display unit (on the display unit).

In one advantageous configuration, the holder communication unit can establish a communication connection to a plurality of circuit breaker communication units. The display holder is configured in such a way that the data of the connected circuit breakers are displayable in the latched state of the display unit (in parallel or serially, i.e. simultaneously or successively) (on said display unit).

This has the advantage that the data of the circuit breaker are displayable on the circuit breaker; alternatively, in the case where the circuit breaker is installed in a closed switchgear cabinet, for example, the data can be displayed on the switchgear cabinet without the latter being opened. This allows convenient monitoring of the circuit breakers situated in the closed switchgear cabinet. In one particularly advantageous configuration, the data of a plurality of circuit breakers installed in the switchgear cabinet can be conveniently displayed by a single display (in particular sequentially). Convenient monitoring of a plurality of circuit breakers, e.g. installed in switchgear cabinets, is thus possible.

Advantageous configurations are specified in the dependent claims.

In one advantageous configuration, the display unit is latchable to the front side of the circuit breaker.

This has the particular advantage that the display unit is visible particularly well.

In one advantageous configuration of the invention, the display unit is latchable into the electronic control unit (ETU) of the circuit breaker.

This has the particular advantage of affording a short and direct (electrical) connection between electronic control unit, in particular as primary supplier of the data, and display unit, which reduces a susceptibility to errors.

In one advantageous configuration of the invention, the circuit breaker communication unit is configured in such a way that a wire-free (or wireless) communication, in particular a Bluetooth communication, is possible.

This has the particular advantage of affording a particularly simple communication possibility, available as standard.

In one advantageous configuration of the invention, the display holder has a power supply for the display unit.

This has the particular advantage of affording a power supply for a latched display unit.

In one advantageous configuration of the invention, the display holder has a power supply connection.

This has the particular advantage that an external power supply is made possible.

In one advantageous configuration of the invention, the display holder has at least one magnet in order advantageously to enable in particular a fastening to a switchgear cabinet or a metal door.

In one advantageous configuration of the invention, the holder communication unit is configured in such a way that a Bluetooth communication is possible.

This has the particular advantage of affording a particularly simple communication possibility, available as standard, in particular with an analogously configured circuit breaker communication unit.

In one advantageous configuration of the invention, the display unit has a display, more specifically a touch display, in particular a touch LCD display.

This has the particular advantage of affording a convenient display and input possibility.

In one advantageous configuration of the invention, the display unit has a securing mechanism, for securing the latching connection when the display unit is latched in the circuit breaker or the display holder.

This has the particular advantage that inadvertent or impermissible removal of the display unit is avoided or made more difficult, with the result that secure continuous monitoring is made possible.

In one advantageous configuration of the invention, the display unit also has an input functionality besides a display (functionality).

This has the particular advantage that inputs are possible via the display unit, with the result that a compact realization of an output and input is possible.

In one advantageous configuration of the invention, the electrical plug connection is a USB connection, in particular a USB type C connection.

This has the particular advantage of affording a particularly simple communication possibility, available as standard, with a high volume of transferrable data.

All configurations, both in dependent form referring back to independent patent claims, and referring back only to individual features or feature combinations of patent claims, bring about an improvement of a (low-voltage) circuit breaker with display unit, in particular a more universal use of a display unit.

Other features which are considered as characteristic for the invention are set forth in the appended claims.

Although the invention is illustrated and described herein as embodied in a system, a circuit breaker, a display unit and a display holder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
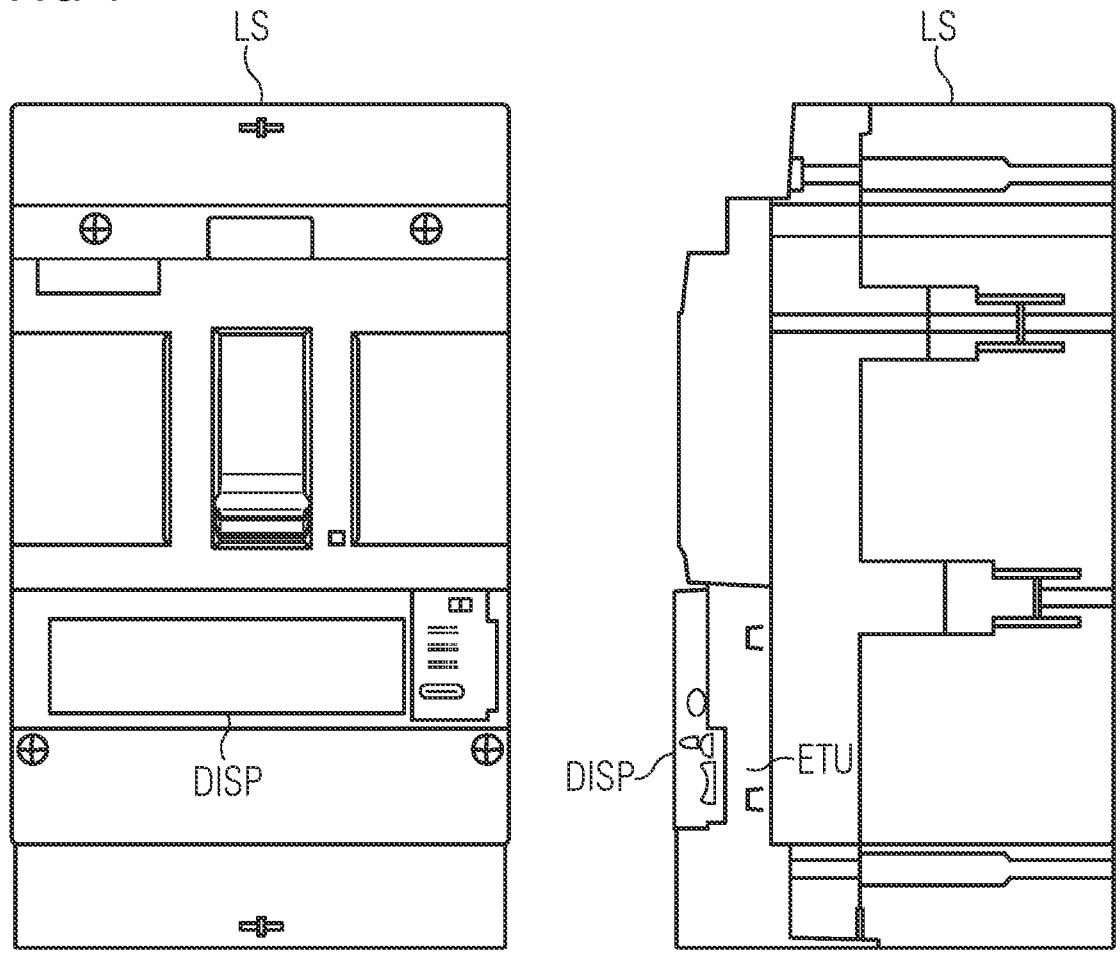
FIG. 1 is a schematic illustration of a circuit breaker for elucidating the invention.

Referring now to the figures of the drawings in detail and first, particularly to FIG. 1 thereof, there is shown, in the left-hand region, a circuit breaker LS in plan view, i.e. from the front. In the right-hand region, the circuit breaker LS can be seen in side view. The circuit breaker LS is for example a low-voltage circuit breaker, e.g. a molded case circuit breaker (MCCB) as in the example in accordance with FIG. 1. The circuit breaker LS has an electronic control unit ETU. The electronic control unit ETU has a display unit DISP. The display unit DISP has a display housing. The circuit breaker LS, in particular the electronic control unit ETU, and the display unit DISP are configured in such a way that the display unit DISP can be latched to the circuit breaker LS, in particular into the electronic control unit ETU. This is effected in such a way that the display unit DISP is visible on the circuit breaker LS. The circuit breaker LS and the display unit DISP, in the latched state, are connected to one another by an electrical plug connection ES1 (not visible in FIG. 1), such that data of the circuit breaker LS are displayable on the display unit DISP, and are displayed in the (power-supplied) switched-on state (or in the state ready for operation).

Figure 2:
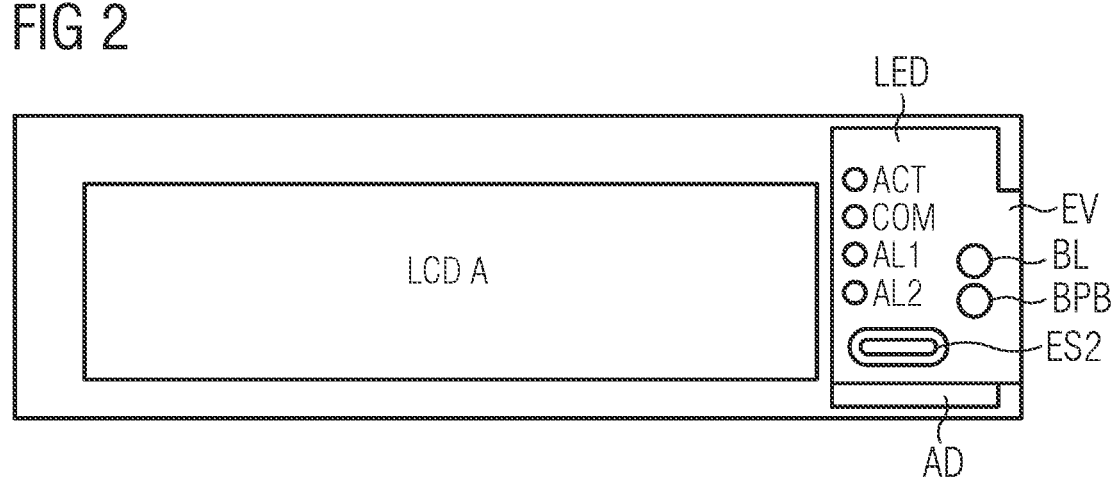
FIG. 2 is a schematic illustration of a display unit for elucidating the invention.

FIG. 2 shows a schematic illustration of an exemplary display unit DISP. The display unit DISP has a (touch) (LCD) display LCDA, in particular for displaying data of the circuit breaker LS.

The display unit DISP has display elements LED, in the example four indicated display elements LED.

The display unit DISP has an indicated latching connection EV.

The display unit DISP has a securing mechanism BL, for securing the latching connection EV when the display unit is latched in the circuit breaker or the display holder. By way of example, the securing mechanism BL can have a bayonet lock.

The display unit DISP has a pairing switch BPB, for establishing or enabling a communication connection to at least one circuit breaker communication unit, in particular a plurality of circuit breaker communication units.

The display unit DISP has a second electrical plug connection ES2, in particular on the front of the display unit DISP.

The display unit DISP has a cover AD, in particular for the second electrical plug connection ES2, the pairing switch BPB or/and the securing mechanism BL, as depicted by way of example in FIG. 2.

Figure 3:
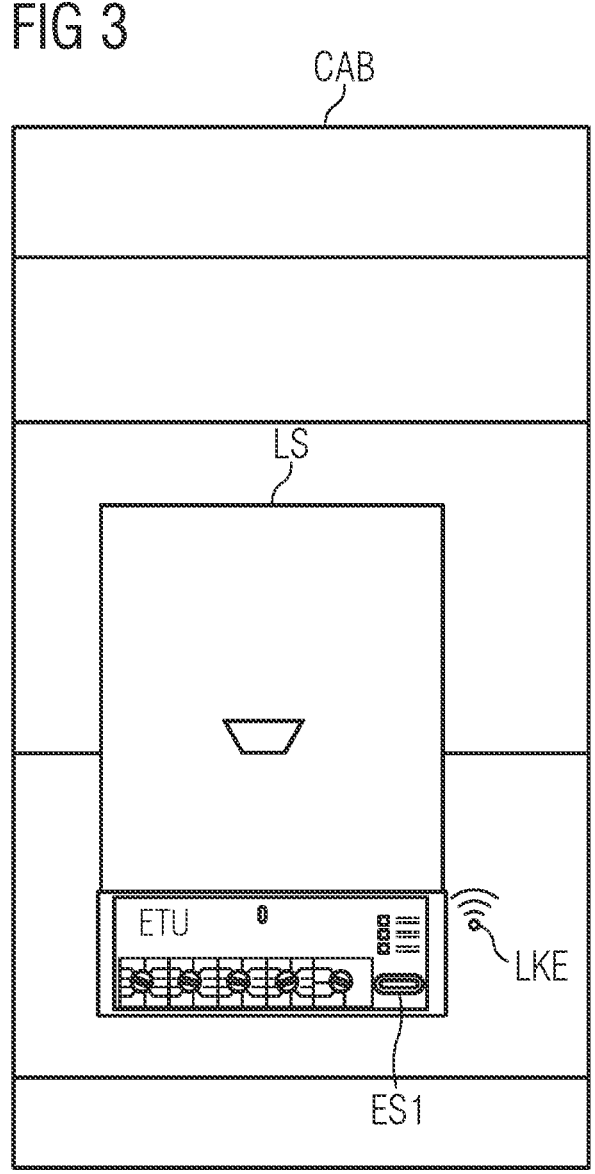
FIG. 3 is a schematic illustration of a circuit breaker in a switchgear cabinet for elucidating the invention.

FIG. 3 shows a schematic illustration of one circuit breaker LS in a switchgear cabinet CAB. Alternatively, a plurality of circuit breakers can be arranged in the switchgear cabinet CAB.

Figure 4:
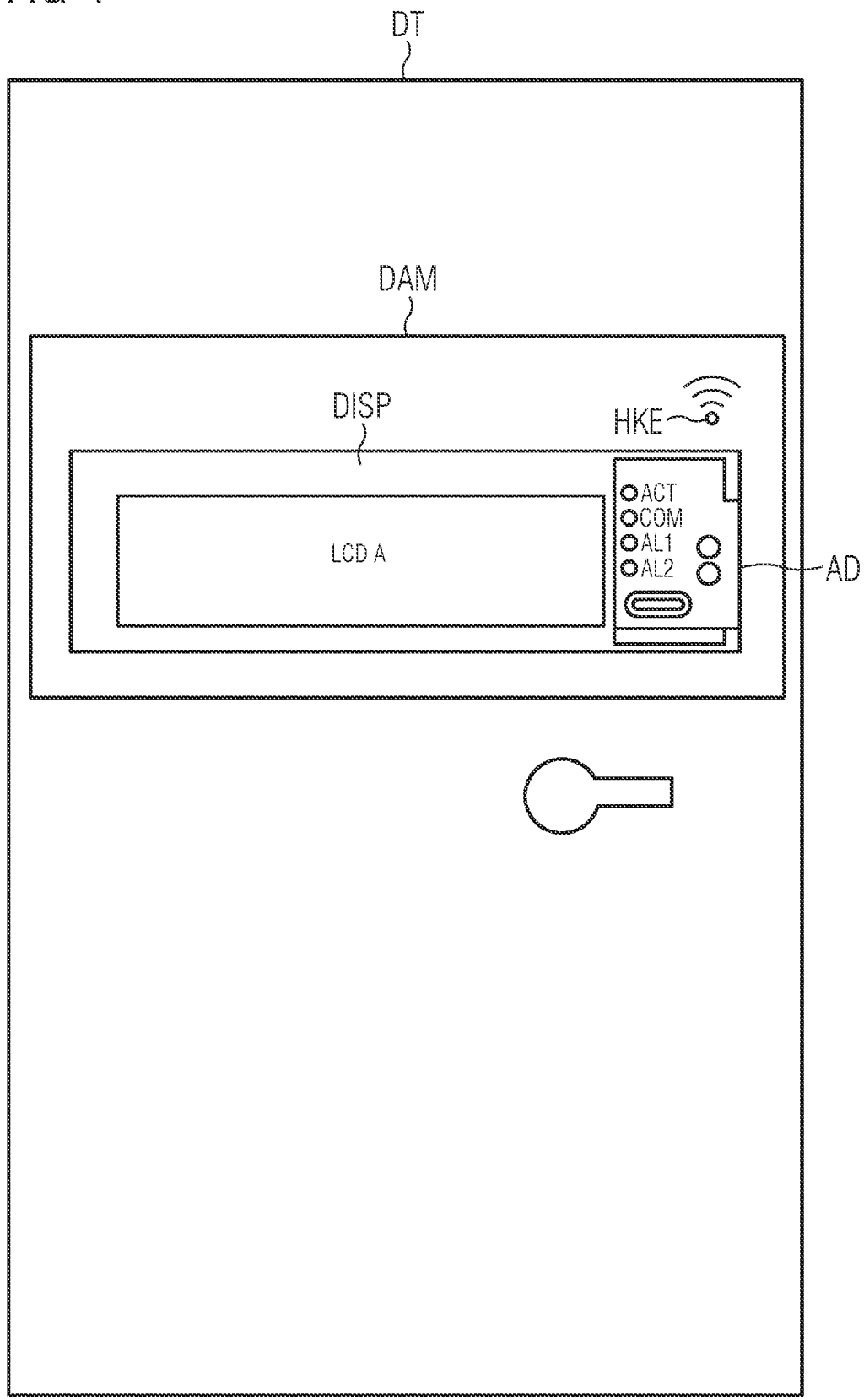
FIG. 4 is a schematic illustration of a switchgear cabinet door with a display holder for elucidating the invention.

FIG. 4 shows a schematic illustration of a switchgear cabinet door with a display holder. The switchgear cabinet CAB is illustrated or indicated with a closed switchgear cabinet door DT. The switchgear cabinet door DT has a display holder DAM, with a latched display unit DISP.

The switchgear cabinet CAB or/and the switchgear cabinet door DT preferably consist(s) at least partly of metal, in particular steel or an iron-containing alloy. In this case, the display holder DAM preferably has, as configuration, at least one magnet in order to enable in particular a fastening to the switchgear cabinet CAB or the (switchgear cabinet) metal door DT.

The display holder DAM has a power supply for the display unit DISP. In this case, the display holder DAM can have a power supply connection, indicated by an arrow and 24 V, for example for feeding in a supply voltage, for example of 24 volts.

The display holder DAM has a holder communication unit HKE, indicated by a symbol. The circuit breaker analogously has a circuit breaker communication unit LKE, indicated by the same symbol. Both communications units LKE, HKE can be connected by a communication connection, for example by a Bluetooth communication.

Figure 5:
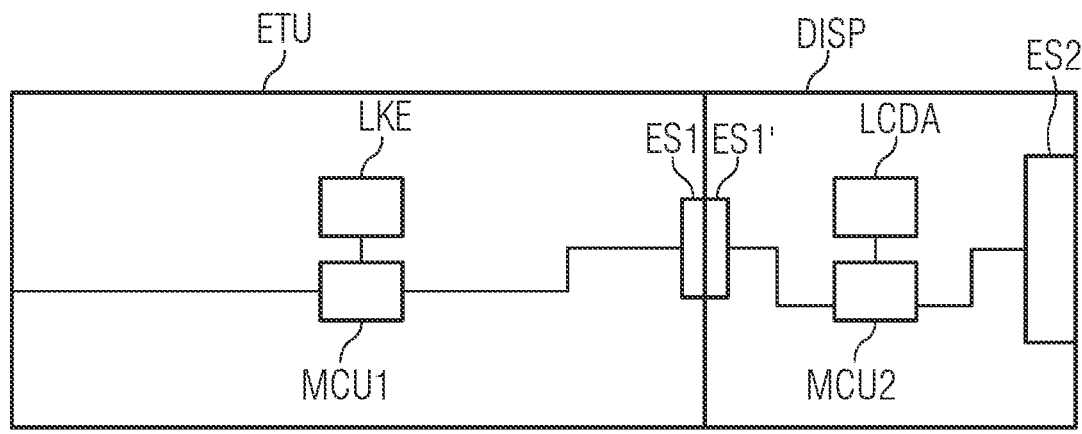
FIG. 5 is a schematic illustration of a display unit with a circuit breaker for elucidating the invention.

FIG. 5 shows a schematic illustration of a display unit DISP with a circuit breaker LS, in particular with an electronic control unit ETU.

The electronic control unit ETU has a first processor MCU1. The latter is connected to a circuit breaker communication unit LKE. The first processor MCU1 is furthermore connected to a first electrical plug connection ES1; in the example, the first processor is connected to the circuit breaker-side or electronic control unit-side part of the first electrical plug connection ES1. The electrical plug connection ES1 can be for example a USB connection, in particular a USB type C connection.

The display unit DISP has a second processor MCU2. The latter is connected to the first electrical plug connection ES1; in the example, to the display-side part of the first electrical plug connection ES1'. (The electrical plug connection ES1 can be for example a USB connection, in particular a USB type C connection).

The second processor MCU2 is furthermore connected to the (touch) LCD display LCDA.

The second processor MCU2 is furthermore connected to the second electrical plug connection ES2, to the display-side part of the second electrical plug connection ES2 in the example. The second electrical plug connection ES2 can for example likewise be a USB connection, in particular a USB type C connection.

The first or/and second processor can be connected to further units.

In the example in accordance with FIG. 5, the display unit DISP is latched to the circuit breaker LS, in particular to the electronic control unit ETU therefore. In this case, i.e. in the latched state, the circuit breaker LS and the display unit DISP are connected to one another by the first electrical plug connection ES1, such that data of the circuit breaker are displayable on the display unit.

Figure 6:
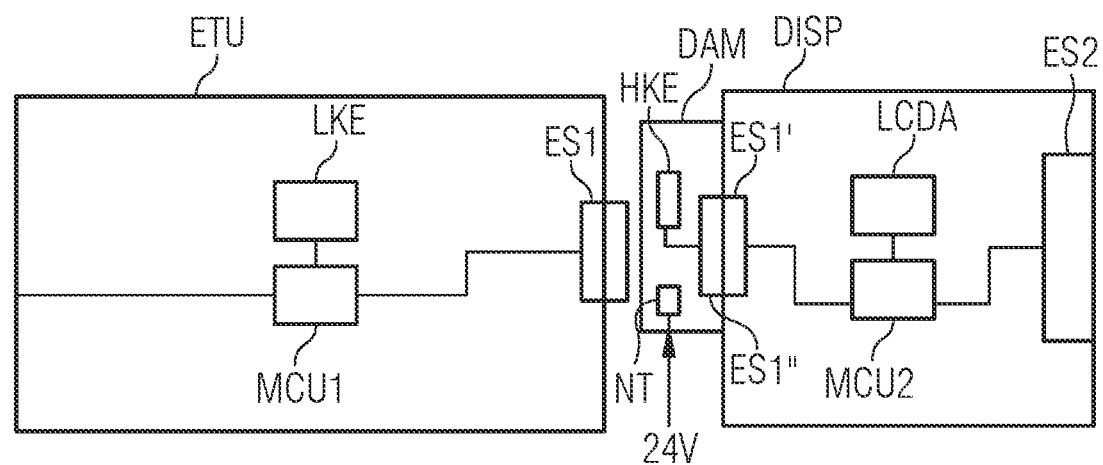
FIG. 6 is a schematic illustration of a display unit with a display holder and also a circuit breaker for elucidating the invention.

FIG. 6 shows a schematic illustration of a display unit DISP with a display holder DAM and also a circuit breaker LS. FIG. 6 shows an illustration in accordance with FIG. 5, with the difference that the display unit DISP has been plugged or latched into a display holder DAM. The display holder has a holder housing, a holder communication unit HKE and the first electrical plug connection ES1".

The first electrical plug connection ES1" is preferably identical to the circuit breaker-side or electronic control unit-side part of the first electrical plug connection ES1. Furthermore, a power supply NT is provided. The latter can have a power supply connection 24 V. The power supply NT can serve for supplying the display holder and the display unit.

In the example in accordance with FIG. 6, the display unit DISP has been latched into the display holder DAM. The display holder DAM and the display unit DISP, in the latched state, are connected to one another by the first electrical plug connection (ES1), ES1', ES1". The display holder DAM, by means of the holder communication unit HKE, establishes a (wireless) communication connection to at least one circuit breaker communication unit LKE, in particular to a plurality of circuit breaker communication units LKE (of a plurality of circuit breakers). The data of the circuit breaker LS or optionally the data of the connected circuit breakers are transferred by the holder communication unit HKE via the first electrical plug connection ES1', ES2"

(in the latched state of the display unit) to the display unit DISP and can be displayed there.

The power supply NT can be connected to an (external) supply voltage. Alternatively or additionally, the power supply NT can be connected to an external or internal battery BAT, which enables or supports mobile operation.

The invention proposes a display unit (display module) comprising an in particular latching mechanism or catch mechanism, for latching into the circuit breaker, in particular the electronic control unit ETU. Furthermore a display holder (door mounting module) DAM. The latter has the same latching mechanism or catch mechanism.

The display holder DAM is configured in such a way that a connection to one circuit breaker (one to one) or to multiple (many) circuit breakers is possible (many to one). If the display holder DAM is attached to the cabinet door, the status of one or more circuit breakers/devices in the cabinet can be displayed, without the door being opened during operation.

The display holder has a holder communication unit for wireless connection. The complexity of the cabling and the costs for operators are thus reduced.

Although the invention has been more specifically illustrated and described in detail by means of the exemplary embodiment, nevertheless the invention is not restricted by the examples disclosed and other variations can be derived therefrom by the person skilled in the art, without departing from the scope of protection of the invention.

The invention claimed is:

1. A circuit breaker system for an electrical low-voltage circuit, the circuit breaker system comprising:
   a circuit breaker containing:
      a circuit breaker housing having connections for conductors of the electrical low-voltage circuit;
      a current sensor for determining a magnitude of a current in the electrical low-voltage circuit;
      an interruption unit having contacts for interrupting the electrical low-voltage circuit;
      an electronic control unit connected to said current sensor and said interruption unit and initiating an interruption of the electrical low-voltage circuit in an event of current limit values or current-time limit values being exceeded;
      a circuit breaker communication unit;
      a display unit having a display housing, said circuit breaker and said display unit configured such that said display unit being latched to said circuit breaker, such that said display unit is visible on said circuit breaker;
      an electrical plug connection, said circuit breaker and said display unit, in a latched state, being connected to one another by said electrical plug connection, such that data of said circuit breaker are displayable on said display unit; and
   a display holder, containing:
      a holder housing;
      a holder communication unit;
      said display holder configured such that said display unit being latched into said display holder, said display holder and said display unit, in a latched state, are connected to one another by said electrical plug connection; and
      said display holder, by means of said holder communication unit, establishing a communication connection to a plurality of circuit breaker communication units, and said display holder being configured such that data of connected circuit breakers are displayed in the latched state of said display unit.

2. The circuit breaker system according to claim 1, wherein said circuit breaker is one of a plurality circuit breakers.

3. The circuit breaker according to claim 2, wherein said circuit breaker communication unit is configured to perform wireless communication.

4. The circuit breaker according to claim 3, wherein said wireless communication is Bluetooth communication.

5. A circuit breaker for electrical low-voltage circuit, the circuit breaker comprising:
   a circuit breaker housing having connections for conductors of the electrical low-voltage circuit;
   a current sensor for determining a magnitude of a current in the electrical low-voltage circuit;
   an interruption unit having contacts for interrupting the electrical low-voltage circuit;
   an electronic control unit connected to said current sensor and said interruption unit and initiating an interruption of the electrical low-voltage circuit in an event of current limit values or current-time limit values being exceeded;
   a circuit breaker communication unit;
   a display unit having a display housing, said display unit configured such that said display unit is latched to the circuit breaker, such that said display unit is visible on the circuit breaker;
   an electrical plug connection, the circuit breaker and said display unit, in a latched state, are connected to one another by said electrical plug connection, such that data of said circuit breaker are displayable on said display unit; and
   a display holder, containing:
      a holder housing;
      a holder communication unit;
      said display holder configured such that said display unit being latched into said display holder, said display holder and said display unit, in a latched state, are connected to one another by said electrical plug connection; and
      said display holder, by means of said holder communication unit, establishing a communication connection to a plurality of circuit breaker communication units, and said display holder is configured such that data of connected circuit breakers are displayed in the latched state of said display unit.

6. The circuit breaker according to claim 5, wherein said display unit is latchable to a front side of the circuit breaker.

7. The circuit breaker according to claim 5, wherein said display unit is latchable into said electronic control unit.

8. A display holder for a display unit of a circuit breaker, the display holder comprising:
   a holder housing;
   a holder communication unit;
   an electrical plug connection, the display holder configured such that the display unit being latched into the display holder, said display holder and the display unit, in a latched state, are connected to one another by said electrical plug connection; and
   the display holder, by means of said holder communication unit, establishing a communication connection to a plurality of circuit breaker communication units of the circuit breaker, and the display holder is configured such that data of connected circuit breakers are displayed in the latched state of the display unit.

9. The display holder according to claim 8, further comprising a power supply for the display unit.

10. The display holder according to claim 8, further comprising a power supply connection.

11. The display holder according to claim 8, further comprising at least one magnet, in order to enable a fastening to a switchgear cabinet or a metal door.

12. The display holder according to claim 8, wherein said holder communication unit is configured to perform wireless communication.

13. The display holder according to claim 12, wherein the wireless communications is Bluetooth communications.

\* \* \* \* \*